(12) United States Patent
Simons (10) Patent No.: US 8,903,457 B2
(45) Date of Patent: Dec. 2, 2014

(54) WIRELESS DATA APPARATUS, SYSTEM AND METHOD

(71) Applicant: NXP B.V., Eindhoven (NL)

(72) Inventor: Sven Simons, Gratkorn (AT)

(73) Assignee: NXP B.V., Eindhoven (NL)

( * ) Notice: Subject to any disclaimer, the term of this patent is extended or adjusted under 35 U.S.C. 154(b) by 66 days.

(21) Appl. No.: 13/922,067

(22) Filed: Jun. 19, 2013

(65) Prior Publication Data

US 2014/0051364 A1 Feb. 20, 2014

Related U.S. Application Data

(60) Provisional application No. 61/684,165, filed on Aug. 17, 2012.

(51) Int. Cl.
| | |
|---|---|
| *H04M 1/00* | (2006.01) |
| *B60R 25/20* | (2013.01) |
| *H04W 52/02* | (2009.01) |
| *H04B 1/38* | (2006.01) |
| *H04M 1/66* | (2006.01) |
| *H04M 1/68* | (2006.01) |
| *H04M 3/16* | (2006.01) |

(52) U.S. Cl.
CPC .......... *B60R 25/20* (2013.01); *H04W 52/0229* (2013.01); *H04B 1/3822* (2013.01)
USPC ...................................... 455/569.2; 455/411

(58) Field of Classification Search
CPC .................. H04B 1/3822; H04W 52/0229
USPC ........... 455/569.2, 575.9, 95, 96, 99, 345, 68, 455/410, 411
See application file for complete search history.

(56) References Cited

U.S. PATENT DOCUMENTS

| | | | | |
|---|---|---|---|---|
| 6,943,725 | B2 * | 9/2005 | Gila et al. | 342/42 |
| 2011/0230197 | A1 * | 9/2011 | Wu et al. | 455/450 |

\* cited by examiner

*Primary Examiner* — Eugene Yun (57) ABSTRACT

In accordance with various example embodiments, a vehicle base station wirelessly communicates data with a remote transceiver circuit. The remote transceiver circuit intermittently transitions a data-receiving circuit of the remote transceiver circuit between on and off states. The vehicle base station intermittently polls the remote transceiver circuit with a series of data packets, at least one of which the data-receiving circuit of the remote transceiver circuit will receive while in the on state. The remote transceiver circuit, upon receiving the data packet, will reset a state counter to enable the remote transceiver circuit to receive a wake-up data packet while operating in the on state; in response, transmitting response data to the vehicle base station. The data communication is carried out to facilitate authentication of the remote transceiver. Exemplary embodiments include a system for passive keyless go and passive keyless entry in a vehicle.

20 Claims, 4 Drawing Sheets

100
WIRELESS DATA APPARATUS, SYSTEM AND METHOD

Aspects of various embodiments of the present disclosure are directed to wireless data communication applications.

Many wireless communication systems employ transceivers with base stations that communicate with one another. For example, transceivers can be used in automotive applications for passive keyless entry (PKE) for unlocking the doors of a vehicle, or passive keyless go (PKG) for enabling an ignition circuit. Generally, transceivers communicate with a base station to unlock doors and/or an automobile ignition, or otherwise enable related circuits. Many such circuits use an ISM (Industrial Scientific Medical) frequency band of about 125 kHz, which can be useful in a metal environment (as with automobiles) and is relatively insensitive to de-tuning (e.g., by touching).

In some implementations, the high energy consumption of such transceivers can result in the transceiver's limited power supply draining and requiring replacement. When the power supply is no longer able to supply the required current to operate the transceiver circuit, the consumer will be unable to access and/or operate the vehicle.

These and other matters have presented challenges to the design and implementation of wireless systems for a variety of applications.

Various example embodiments are directed to remote transceiver circuits and their implementation. Other embodiments are directed to base stations that communicate with such remote transceiver circuits. Still other embodiments are directed to systems including one or more of such remote transceiver circuits and base stations.

According to an example embodiment, wireless communication is effected between a vehicle base station and a remote transceiver circuit, such as for providing PKE access to a vehicle. The vehicle base station transmits radio frequency signals including a number (N) of at least three data packets with a time gap ($T_G$) between each data packet. Each data packet has a first length in time ($T_1$) and includes data that is common to all of the at least three data packets. After transmitting the series of at least three data packets, the base station transmits a radio frequency signal including a wake-up data packet. The remote transceiver circuit includes a data-receiving circuit to receive the radio frequency signals from the vehicle base station. The remote transceiver circuit intermittently transitions between on and off states in which the data-receiving circuit is respectively enabled and not enabled.

In some embodiments, the on state is defined by a length in time ($T_{ON}$) as $$T_{ON} \geq T_G + 2T_1 \quad \text{(Equation 1),}$$

and each off state occurs for a length in time ($T_{OFF}$) as $$T_{OFF} < ((N)-2)*T_1 + ((N)-1)*T_G \quad \text{(Equation 2).}$$

In response to receiving at least one of the data packets, via the data-receiving circuit, the remote transceiver circuit operates in the on state for at least a period $T_{ON}$. In response to receiving the wake-up data packet while operating in the on state, the remote transceiver circuit transmits response data to the vehicle base station.

According to an example embodiment, $T_{OFF}$ factors in an initialization period for the data-receiving circuit ($T_{STARTUP}$) as follows:

$$T_{OFF} < ((N)-2)*T_1 + ((N)-1)*T_G - T_{STARTUP} \quad \text{(Equation 3).}$$

Accordingly, the embodiments described above may further implement such a factor.

Another embodiment is directed to a transceiver as above, which operates with a vehicle base station as discussed above. The transceiver includes an antenna, a data-receiving circuit coupled to the antenna and that receives radio frequency signals via the antenna, and a controller circuit that operates the data-receiving circuit in the on and off states as described above.

Another example embodiment is directed to a vehicle base station for wirelessly communicating with remote transceiver circuits, as may be implemented with one or more embodiments above. The base station includes an authentication module and an interface that communicates data over a vehicle bus. The vehicle base station generates and transmits a series of data packets followed by a wake-up data packet to communicate authentication data with the remote transceiver circuit, and also to receive authentication data from the remote transceiver circuit. The authentication module processes authentication data received from the remote transceiver with stored authentication data and determines whether the remote transceiver is authentic. Activation data is communicated over the vehicle bus, via the interface module, to control the operation of at least one vehicle circuit based on the authentication.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

While the disclosure is amenable to various modifications and alternative forms, specifics thereof have been shown by way of example in the drawings and will be described in detail. It should be understood, however, that the disclosure is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of devices, systems and arrangements involving remote transceiver-vehicle base station communication, including those involving automotive applications. While the present disclosure is not necessarily so limited, various aspects of the disclosure may be appreciated through a discussion of examples using this context.

Various example embodiments are directed to circuits and methods that address challenges, such as those identified in the background above. In accordance with one or more embodiments, wireless communication is effected between a vehicle base station and a remote transceiver circuit. The vehicle base station transmits radio frequency signals including a number (N) of at least three data packets with a time gap ($T_G$) between each data packet. Each data packet has a first length in time ($T_1$) and includes data that is common to all of the at least three data packets. In some embodiments, the series of data packets contain identical data. After transmitting the series of at least three data packets, the base station transmits a radio frequency signal including a wake-up data packet.

The remote transceiver circuit includes a data-receiving circuit that receives the radio frequency signals from the vehicle base station. The remote transceiver circuit intermittently transitions between on and off states in which the data-receiving circuit is respectively enabled and not enabled. The on state intermittently occurs between off states for a time period $T_{ON}$ as follows:

$$T_{ON} \geq T_G + 2T_1 \quad \text{(Equation 1).}$$

Each off state intermittently occurs between on states for a length in time $T_{OFF}$ as follows:

$$T_{OFF} < ((N)-2)*T_1 + ((N)-1)*T_G \quad \text{(Equation 2).}$$

In response to receiving at least one of the data packets, via the data-receiving circuit, the remote transceiver circuit operates in the on state for at least a period $T_{ON}$. In response to receiving the wake-up data packet while operating in the on state, the remote transceiver circuit transmits response data to the vehicle base station.

In certain embodiments, the vehicle base station provides access to a vehicle in response to detecting the presence of the remote transceiver circuit. For example, the vehicle base station receives the remote transceiver circuit's transmitted response data, reply wake-up data, and/or other data such as authentication data.

According to another example embodiment, the data packets include synchronization data, which establishes consistency among the data from the vehicle base station to the remote transceiver circuit, and vice versa. For example, the synchronization data may be used to determine which of a plurality of authentication codes, on the remote transceiver side, and reference codes, on the base station side, the base station and the remote transceiver are to compare and transmit, respectively, for the purposes of an instant authentication attempt. In some embodiments, the transceiver, while in the on state, scans for the synchronization data contained within the at least three data packets in the series.

Various example embodiments are directed toward an apparatus, according to one or more of the various example embodiment above, where the length in time $T_{OFF}$ (the length of time the remote transceiver circuit is in the off state prior to transitioning into the on state), includes an initialization time ($T_{STARTUP}$). The initialization time is representative of the time required for a data-receiving circuit within the remote transceiver circuit to begin receiving wireless signals from the vehicle base station. In consideration of $T_{STARTUP}$, the off state has a length in time of $$T_{OFF} < ((N)-2)*T_1 + ((N)-1)*T_G - T_{STARTUP} \quad \text{(Equation 3).}$$

Such initialization time may also be accounted for in the $T_{ON}$ equation such as in Equation 6 below.

According to various aspects of the present disclosure, the vehicle base station transmits a series of three data packets, and the remote transceiver circuit receives at least one of the three data packets by intermittently transitioning between the on and off states, as defined by:

$$T_{ON} \geq T_G + 2T_1 + T_{STARTUP} \quad \text{(Equation 4), and}$$

$$T_{OFF} < T_1 + 2*T_G - T_{STARTUP} \quad \text{(Equation 5).}$$

To enable the on and off modes that allow for the remote transceiver circuit to reduce power usage, the remote transceiver circuit, in certain embodiments, stores the value of $T_{ON}$ and $T_{OFF}$, and the vehicle base station stores the values of $T_G$, $T_1$ and N. As discussed above, the values of $T_{ON}$, $T_{OFF}$, $T_G$ and $T_1$ relate to each other based on the mathematical relationships disclosed above.

In various embodiments of the present disclosure, a 10% margin of error is used to compensate for inaccuracies throughout the remote transceiver circuit and the vehicle base station; particularly low power RC oscillators may cause such inaccuracies in the timing circuit. To guarantee functionality of the present disclosure in imperfect electrical systems, exemplary on and off state equations are defined below:

$$T_{ON} \geq (1.1)*(T_G + 2T_1 + T_{STARTUP}) \quad \text{(Equation 6), and}$$

$$T_{OFF} < (0.9)*(T_1 + 2*T_G - T_{STARTUP}) \quad \text{(Equation 7).}$$

It should also be understood that variations in the equations, including adding additional variables, such as $T_{STARTUP}$, and accounting for variability in the electrical circuits, are covered by the present disclosure in light of the varying exemplary embodiments provided herein.

In certain embodiments, the remote transceiver circuit and the vehicle base station may be coupled to one another, during a manufacturing initialization step and/or a pairing process in the field, by storing values in the remote transceiver circuit and the vehicle base station that are commensurate with the above mathematical relationships. After pairing, the remote transceiver circuit may function intermittently in on and off states while still maintaining the ability to receive 100% of the wake-up data signals sent from the paired vehicle base station.

In certain embodiments, the remote transceiver circuit includes a counter, and is designed to operate in the on state in response to the counter being reset. The counter intermittently transitions the remote transceiver circuit between the on and off states. The counter is reset, during an on state, by the remote transceiver circuit receiving a data packet from the vehicle base station. The counter reset enables the remote transceiver to receive the wake-up data that follows the series of data packets all in a single on mode, thereby preventing the remote transceiver circuit from entering an off state and missing the wake-up data transmission from the vehicle base station. The counter reset places the counter value back to the counter value defined by the transition of the remote transceiver circuit exiting the off state and entering the on state. Such a reset, as defined above, provides a time period $T_{ON}$, whereby the remote transceiver circuit may receive the wake-up data packet from base station. As described above, transitioning from the off-to-on state, the on state is controlled by one of the on state equations as described above. Certain embodiments of the counter include one or more registers to intermittently transition the remote transceiver circuit between the on and off states.

In other embodiments, the remote transceiver circuit intermittently transitions between on and off states, the transition from the on state to the off state triggered by the counter reaching a value corresponding to $T_{ON}$. Accordingly, a value corresponding to $T_{OFF}$ transitions the remote transceiver circuit from the off state to the on state. In some embodiments that counter value is determined by a clock within the remote transceiver circuit. The clock can include a plurality of divider flip-flops connected in a series to derive time intervals from a clock input, also within the remote transceiver circuit. The preprocessor clock input is provided to a first one of the flip-flops in series, and the series of flip-flops divide the clock signal. The remote transceiver powers the clock in both the on and the off states. Certain embodiments include seven divider flip-flops that derive time intervals that are $\frac{1}{128}^{th}$ of a time interval of the preprocessor clock input. Accordingly, each of the flip-flops divide a clock signal provided thereto, with a first flip-flop dividing the preprocessor clock input, and each subsequent clock signal dividing an output clock signal provided from a previous one of the flip-flops in series. The last flip-flop thus provides a clock output signal, which is used by the remote transceiver circuit (e.g., by a counter therein), to transition between the on and off states.

According to various aspects of the present disclosure, the remote transceiver circuit includes a data-receiving circuit, which includes a state machine and channel amplifiers, the state machine further includes a clock. The state machine transitions the remote transceiver circuit between the on and the off states. In one embodiment, the remote transceiver circuit, in the off state, depowers the data-receiving circuit while continuing to power the state machine, and the clock therein. In another embodiment, the remote transceiver circuit, in the off state, depowers the data-receiving circuit channel amplifiers while continuously powering the rest of the data-receiving circuit throughout both on and off states. In both embodiments, the remote transceiver circuit in the on state powers all circuits in the remote transceiver circuit.

Additionally, in certain embodiments, the remote transceiver circuit operates in a PKE system. In response to the remote transceiver circuit receiving the wake-up data packet from the vehicle base station, the remote transceiver circuit transmits response data to the vehicle base station. This step, in the present embodiment, further includes: enabling a controller circuit, completing a received signal strength indicator measurement on the wake-up data packet using the controller circuit, transmitting the response data packet to the vehicle base station with authentication data, and disabling the controller circuit. In the present embodiment, the vehicle base station in response to receiving the response data packet and the authentication data from the remote transceiver circuit operates a vehicle entry circuit that facilitates user entry into the vehicle.

In other embodiments, the remote transceiver circuit operates as a transponder in a PKG system. After receiving the wake-up data packet, the remote transceiver circuit transmits response data to the vehicle base station. In one embodiment, the vehicle base station, in response to receiving response data from the transponder, authenticates the transponder by processing the response data received from the transponder with stored authentication. Upon authenticating the transponder, the vehicle base station operates a vehicle drive circuit that facilitates operation of a vehicle drive system in the vehicle. In another embodiment, the vehicle further includes an interface module, and authentication module, and a vehicle bus. In response to receiving response data from the transponder, the vehicle base station generates an output containing the response data. The output is communicated via a vehicle bus as facilitated by an interface module to the authentication module. The authentication module authenticates the transponder by processing the response data received from the transponder with stored authentication data. If the transponder is authenticated, the authentication module communicates activation data over the vehicle bus, via the interface module, to operate a vehicle drive circuit that facilitates operation of a vehicle drive system in a vehicle.

Various aspects of the present disclosure are also further directed towards different aspects of the wireless data communication system, as described above, along with related methods of manufacture and uses. For example, these methods include the method of use of the vehicle base station in wireless communication with the remote transceiver circuit.

As discussed above, communications with the remote transceiver circuit are effected to ensure the presence of the remote transceiver circuit prior to operating a circuit and/or executing a circuit function, such as prior to enabling a vehicle drive system (e.g., for starting an engine or engaging an electric drive system) or prior to activating a circuit that provides access to the vehicle (e.g., unlocks doors).

Communications between the remote transceiver circuit and vehicle base station can be effected in a variety of manners. For instance, in certain applications, the vehicle base station is in a vehicle, and a remote transceiver circuit is a user-carried device that is used to access the vehicle. When the remote transceiver circuit is in proximity of the vehicle, the vehicle base station communicates with the remote transceiver circuit via an antenna. In some embodiments, the vehicle base station sends a polling signal and the remote transceiver circuit responds to the polling signal (when within range to receive the signal). Upon detection of the response, the base station initiates authentication communications with the remote transceiver.

In other embodiments, the base station does not poll the remote transceiver, and instead the remote transceiver circuit initiates a polling signal. This can be affected, for example, in response to a user interacting with the remote transceiver, such as by pressing a button on the remote transceiver or by moving the remote transceiver (e.g., with motion sensing circuitry in the remote transceiver detecting the movement). A receiver at the base station monitors for the remote transceiver polling signal, and initiates an authentication sequence in response to detecting a remote transceiver polling signal.

In some embodiments, the remote transceiver circuit includes a motion sensor. In such an embodiment, the motion sensor if triggered would enable the active polling mode of the data-receiving circuit. In such an embodiment, when the data-receiving circuit was not in motion, such as when the remote transceiver is on a desk or in an operator's pocket whilst sitting, the motion sensor would disable the active polling mode of the data-receiving circuit further reducing battery use during such periods of inactivity.

As discussed above, various types of base station-remote transceiver circuit communications can be affected in accordance with one or more example embodiments. For instance, as consistent with the discussion herein, one or more embodiments may be implemented with a variety of different types of PKE or PKG systems.

Figure 1:
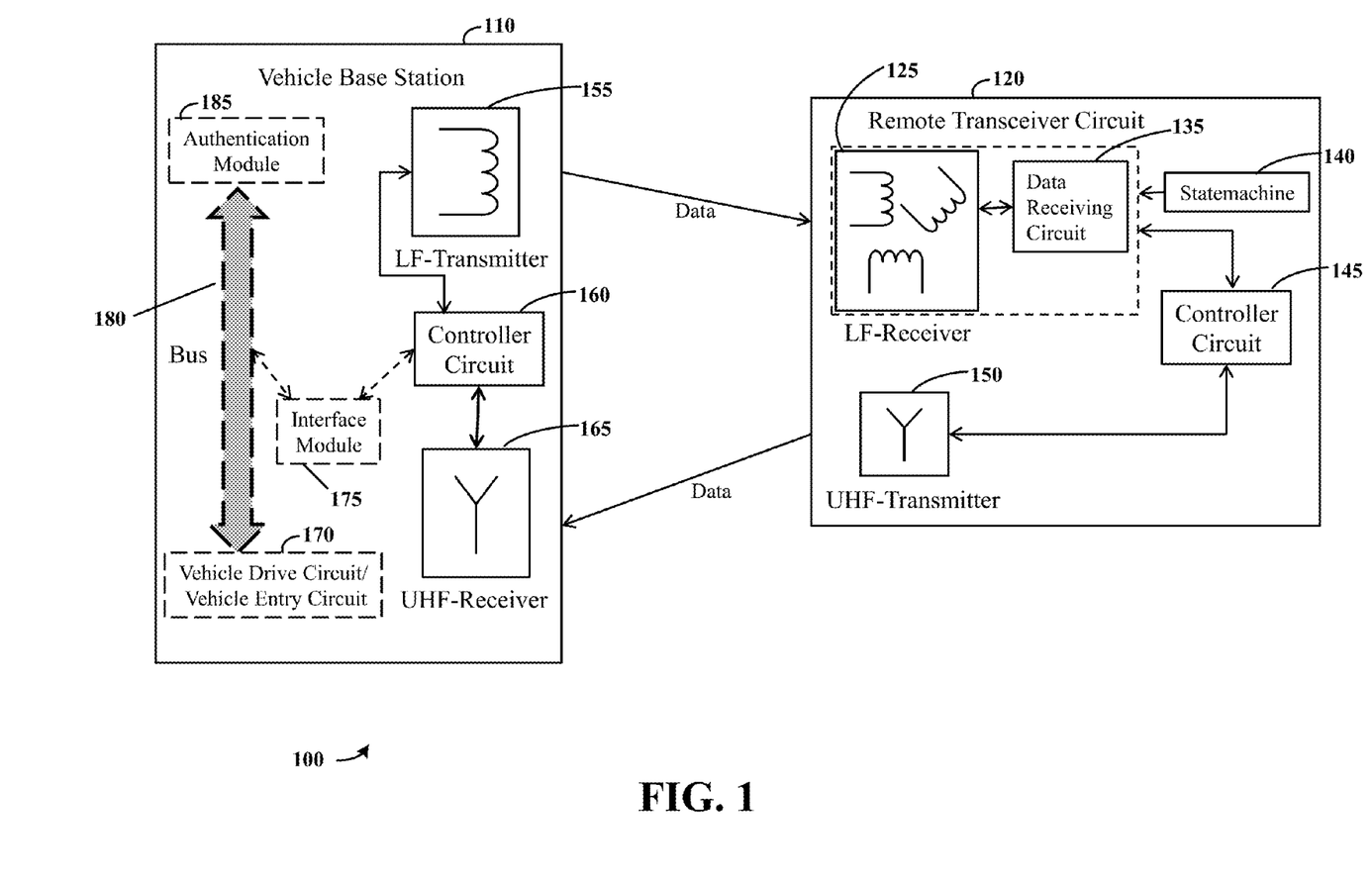
FIG. 1 shows wireless apparatuses and a system for communicating with remote transceiver circuits, in accordance with an example embodiment of the present disclosure.

Turning now to the figures, FIG. 1 shows apparatuses and a system 100 for communicating with remote transceiver circuit 120, in accordance with example embodiments of the present disclosure. The system 100 includes a vehicle base station 110 and a remote transceiver circuit 120. Each of the base station 110, and remote transceiver circuit 120 can be implemented separately, in separate embodiments. Moreover, the system 100 can be implemented with the base station 110 and the remote transceiver circuit 120 while the base station 110 is also interacting with another remote transceiver circuit. In these contexts, the remote transceiver circuit 120 may be a PKE and/or PKG type of hand-held device that can be carried by an operator (e.g., in a pocket or handbag).

The vehicle base station 110 includes a transmitter 155, receiver 165, and a controller circuit 160. The vehicle base station transmitter 155 in one exemplary embodiment is a low-frequency transmitter, and the receiver 165 may be an ultra-high-frequency receiver.

Accordingly, in the same embodiment, the remote transceiver circuit 120 includes a low-frequency receiver 165, and an ultra-high-frequency transmitter 155. The vehicle base station 110 utilizes a controller circuit 160 to control the transmitter 155 and receiver 165 for communicating signals with remote transceiver circuit 120. Accordingly, the controller circuit 160 may be implemented in accordance with one or more embodiments herein, to facilitate data transmission via the transmitter 155 to communicate with the remote transceiver circuit 120.

The embodiment or embodiments shown in FIG. 1 may be implemented using one or more approaches as described herein, such as those involving specific transceiver-based circuits (e.g., channel amplifiers) that are powered according to the on and off states, to conserve power. In addition, one or more embodiments may be implemented with transceiver circuits used in vehicle applications, such as PKE applications, such as with single-chip keyless entry transceivers employing a RISC controller (e.g., the MRKIII from NXP Semiconductors of Eindhoven, The Netherlands) with an ISO 14443 type A interface. In other embodiments, the remote transceiver circuit may implement a controller with a built-in UHF transmitter or a transmitter with a separate controller.

In accordance with one embodiment of the present disclosure, the controller circuit 160 of the vehicle base station 110 delegates authentication of the remote transceiver circuit 120, as discussed in more detail above, to an authentication module 185. Accordingly, the controller circuit 160 generates an output to the interface module 175 containing the response data of the remote transceiver circuit 120 as received by the vehicle base station 110 receiver 165. The interface module 175 then communicates the response data to an authentication module 185 via a bus 180. The authentication module 185 processes the response data received from the remote transceiver circuit 120 with stored authentication data. If the remote transceiver circuit 120 is authenticated, the authentication module 185 communicates activation data over the vehicle bus 180; the activation data allows for the operation of a vehicle drive circuit 170 that facilitates operation of a vehicle drive system in the vehicle.

The remote transceiver circuit 120 includes a receiver 125, a transmitter 150, a controller circuit 145, a statemachine 140, and a data-receiving circuit 135. The remote transceiver circuit 120 utilizes a controller circuit 145 to control the transmitter 150 and receiver 125 for communicating signals with vehicle base station 110. The statemachine 140 of the remote transceiver circuit 120 facilitates the on and off modes of the data-receiving circuit 135. The on and off modes extend the battery life of the remote transceiver circuit 120 by, in-part, eliminating excess periods of receiver operation while also maintaining the sensitivity of the data-receiving circuit 135 to receive data from the vehicle base station 110. Further, while exemplary circuitry is shown for effecting vehicle base station-remote transceiver circuit communications, the remote transceiver circuit 120 and vehicle base station 110 may include additional circuits or components, to suit particular needs.

In some embodiments, the vehicle base station 110 controller circuit includes an interface module for communicating over a vehicle bus. For instance, when implemented in an automobile, the base station 110 can be coupled to communicate with one or more vehicle activation-type circuits, such as a circuit to open/unlock doors and/or a circuit to operate a drive system such as an engine or battery-powered drive. This approach may be simply to "activate" the respective circuit or circuits with operation of the circuit subsequently carried out. For instance, the vehicle base station 110 controller circuit can be connected to a vehicle bus for communicating data over the bus for operating or enabling a vehicle circuit, such as an entry circuit to unlock a door or an ignition circuit for starting an engine.

The vehicle base station 110 may include and/or be coupled to one or more antennas for transmitting data, depending upon the application. In some embodiments, the transmitter and/or receivers of the vehicle base station 110 and the remote transceiver 120 include an array of antennas that facilitate communication with one another. In other embodiments, the vehicle base station 110 receiver 165/transmitter 155 includes a remote antenna, such as a remote antenna near a vehicle door for communicating with a remote transceiver circuit 110, such as an operator-carried transponder. Accordingly, for remote transceiver circuit communications, a single antenna or a subset of antennas may be driven. The respective signals may also be driven at a common carrier frequency.

Figure 2:
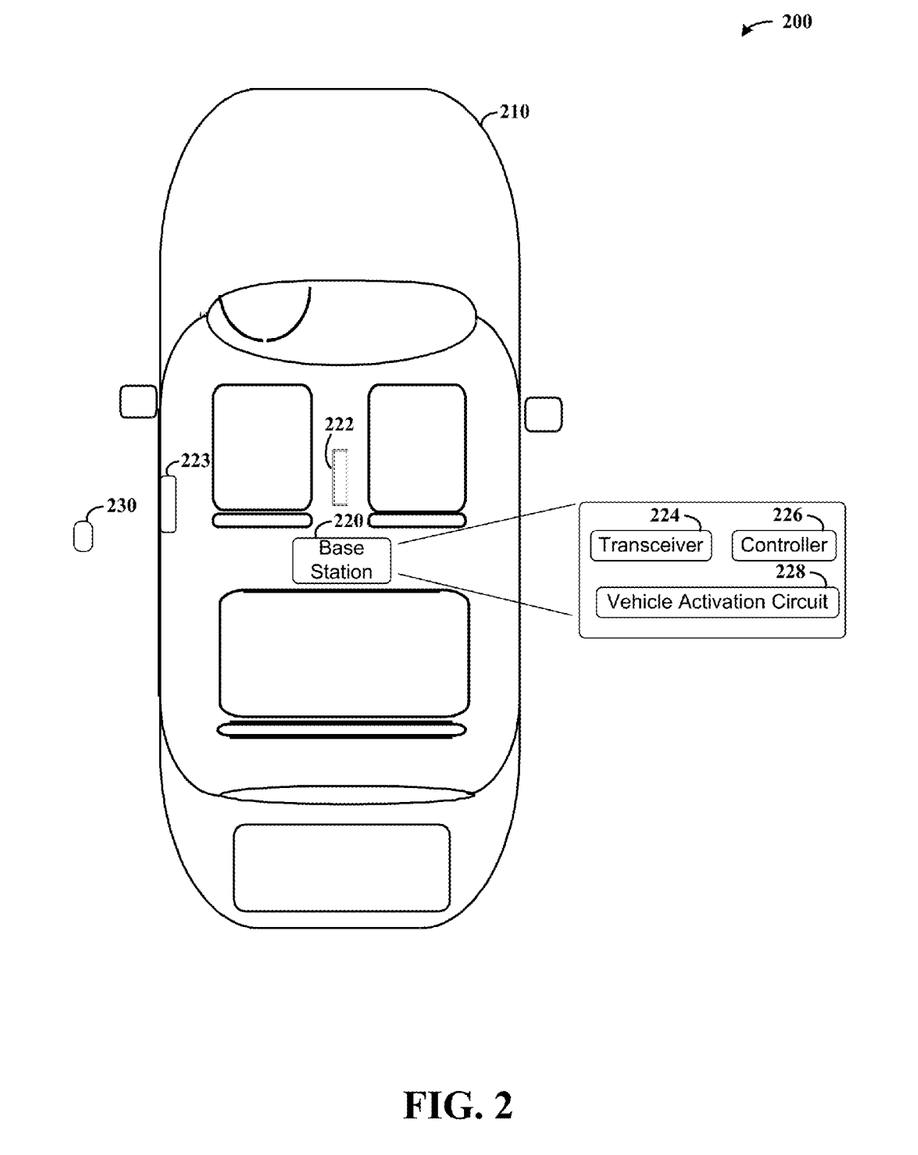
FIG. 2 shows a functional diagram of a wireless communication system, in accordance with another example embodiment of the present disclosure.

FIG. 2 shows a wireless automotive system 200, in accordance with another example embodiment of the present disclosure. The system 200 includes a vehicle base station 220 within a vehicle 210, and an antenna 222 connected to the base station. The base station 220 communicates with a remote transceiver circuit 230 for detecting and authenticating the remote transceiver circuit, in response to which a vehicle circuit is activated. Such activation may include, for example, unlocking a vehicle or enabling a vehicle starter or drive system.

As shown in the inset, the vehicle base station 220 includes a transceiver 224, a controller 226 and a vehicle activation circuit 228. The controller 226 controls the transceiver 224 to generate a signal for communicating data with the remote transceiver. The vehicle activation circuit 228 generates an output that can be used to permit entry to and/or enable a drive system of the vehicle 210. This vehicle activation circuit 228 may, for example, authenticate a remote transceiver 230 and generate a signal in response to the authentication, or may simply pass along data pertaining to authentication communications from the remote transceiver, which can be used by another circuit to authenticate the remote transceiver and enable a vehicle circuit.

In some embodiments, a single antenna, antenna 222 transmits and receives signals for the vehicle base station 220, and in other embodiments, the receiver and transmitter antenna are exclusive, allowing for the use of different radio frequencies for sending and receiving data. For instance, where the antenna 222 is located on a center console of the vehicle 210, a remote transceiver can be placed on or kept near the console (e.g., in an operator's pocket), in order to activate a circuit to start an engine or otherwise engage a drive system.

In some embodiments, a separate antenna 223 is used to communicate with the remote transceiver 230 for effecting access to the vehicle 210. For example, a remote antenna may be located near an entry door near the remote transceiver 230 as shown, and used for communicating data with the remote transceiver 230 for allowing entry to the vehicle. This communication may also be effected to enable a vehicle circuit for operating the vehicle. This approach facilitates access to the antenna, by the remote transceiver 230, when the remote transceiver has limited range. Moreover, access to the internal antenna 222 may be facilitated at short-range to the remote transceiver, to enable a vehicle once access has been granted. In this context, the antenna 223 may be used to detect the presence of (and authenticate) the remote transceiver 230 near the exterior of the vehicle 210 for unlocking a door, and antenna 222 may be used to detect the presence of (and authenticate) the remote transceiver 230 within the vehicle.

Figure 3:
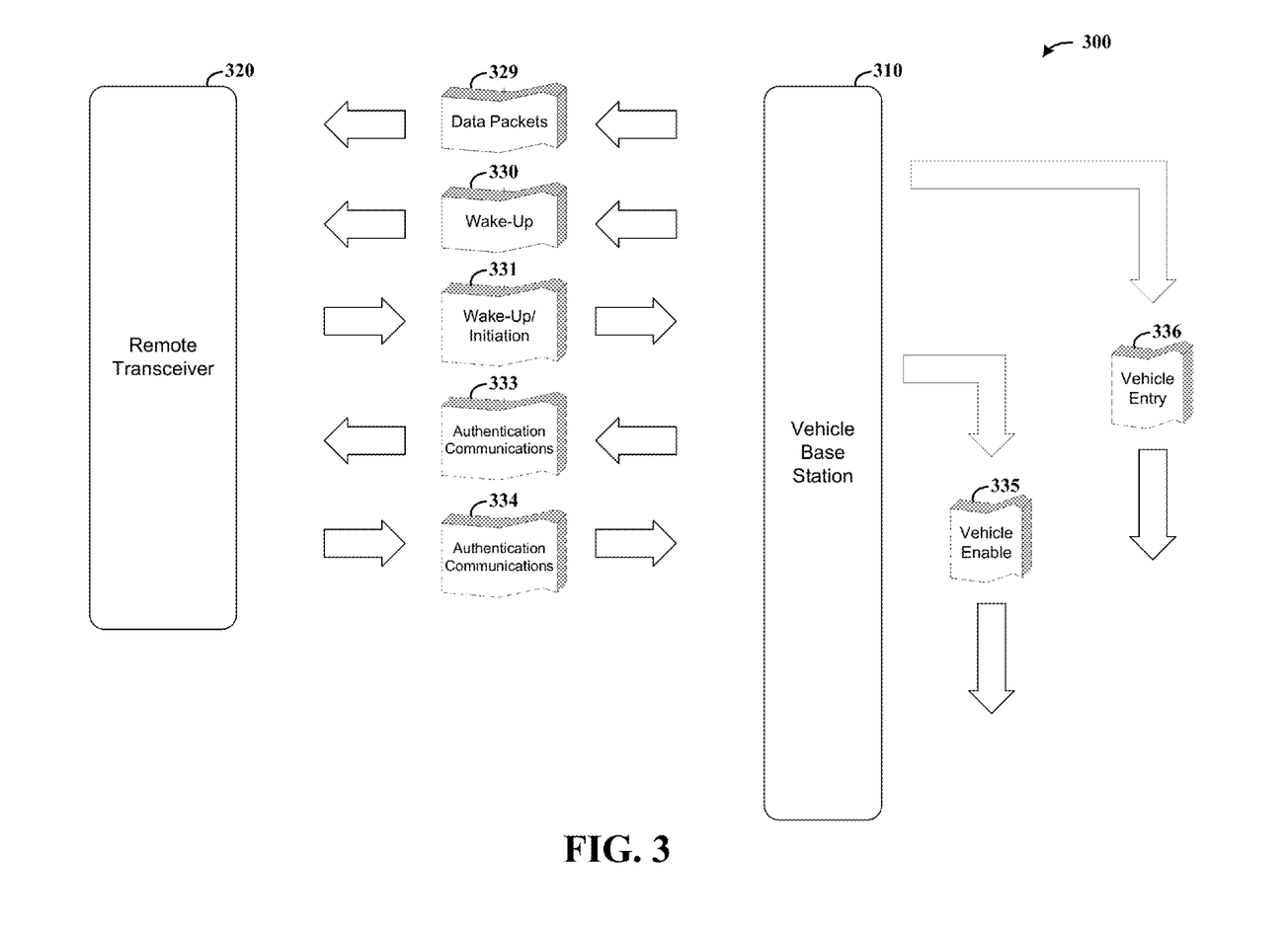
FIG. 3 shows a block diagram of the system and related data flow for remote transceiver circuit authentication, in accordance with another example embodiment of the present disclosure.

FIG. 3 shows a system 300 and related data flow for remote transceiver authentication, in accordance with another example embodiment of the present disclosure. The system includes a vehicle base station 310, and remote transceiver 320. For communicating with the remote transceiver 320, the vehicle base station 310 drives a transmitter to send a series of data packets 329 to the remote transceiver 320. The series of data packets is immediately followed by wake-up communications 330 to the remote transceiver 320. In some embodiments, the remote transceiver 320 responds with a return wake-up/initiation signal 331. In some implementations, the base station 310 does not send the wake-up (e.g., polling) signal, and instead monitors for an initiation signal 331 initiated from the remote transceiver 320.

Once the initiation signal 331 has been detected, the vehicle base station 310 enters into an authentication mode for authenticating the remote transceiver 320 and providing vehicle access or vehicle enablement. During the authentication mode, authentication communications 333 and 334 are respectively sent to and received from the remote transceiver 320. These communications may, for example, also be part of wake-up communications 330 and/or wake-up/initiation signals 331. For authenticated remote transceivers, the base station 310 generates and outputs a vehicle enable signal 335 and/or a vehicle entry signal 336, as discussed in more detail above.

Figure 4:
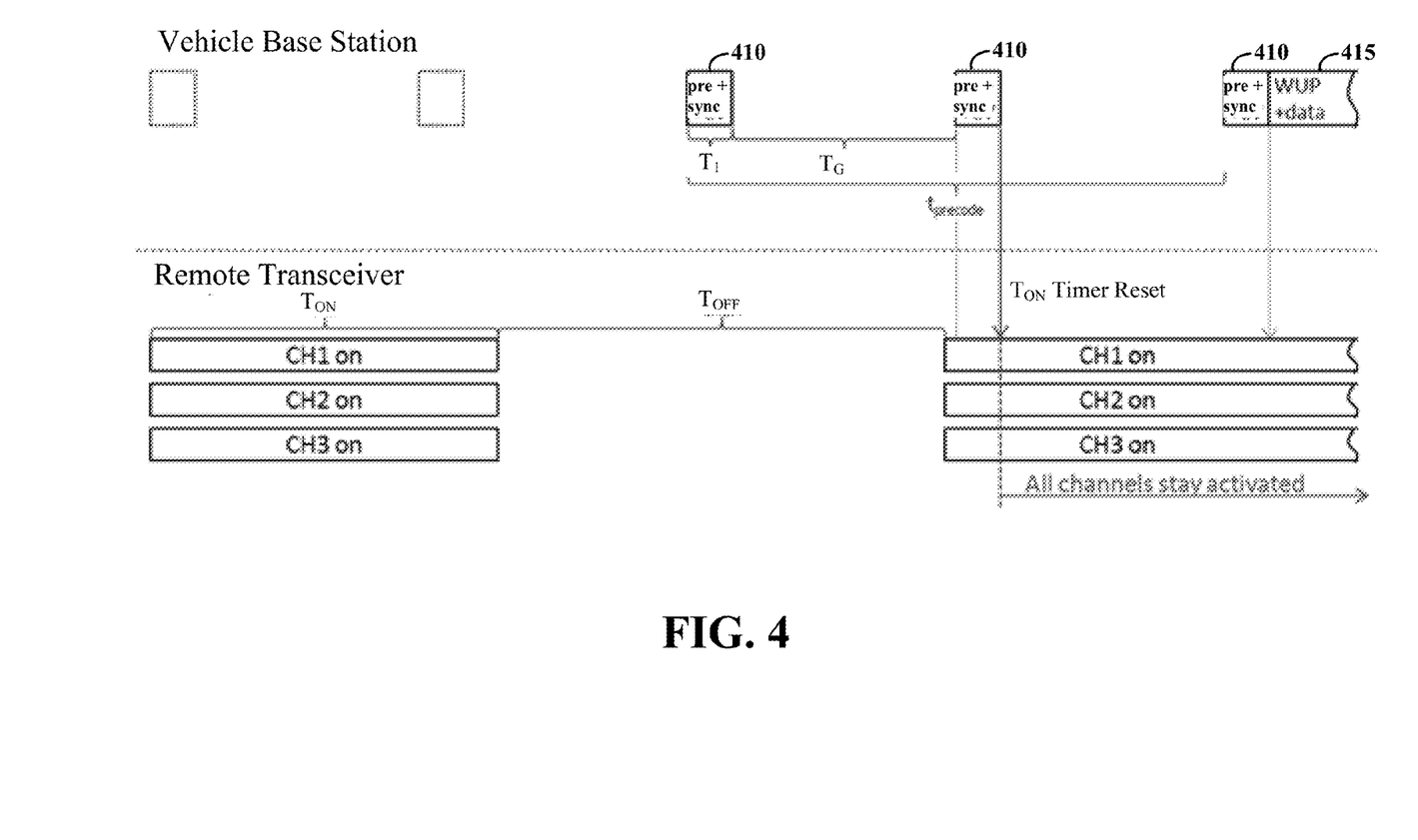
FIG. 4 shows a timewise diagram of an active polling mode for a vehicle base station and a remote transceiver circuit according to an example embodiment of the present disclosure.

FIG. 4 shows a timewise diagram for a vehicle base station and a remote transceiver circuit operating in an active polling mode. The vehicle base station transmits a series of at least three data packets 410. The radio frequency transmission of each data packet 410 spans a time period $T_1$. The gap between each data packet transmission spans a time period $T_G$. Immediately following the series of data packets 410, a wake-up data packet 415 is transmitted from the vehicle base station to the remote transceiver, as described in more detail above. To allow the remote transceiver circuit to intermittently transition between on and off states ($T_{ON}$ and $T_{OFF}$ respectively), wherein the data-receiving circuit is turned on and off respectively, while still maintaining sensitivity of the receiver circuit, the vehicle base station and remote transceiver must conform to one of the equations for $T_{ON}$ and $T_{OFF}$, and/or conform to allowable variations as disclosed above.

With the variables controlled by the vehicle base station and remote transceiver all in conformance with the present disclosure, the power consumption of the remote transceiver is reduced by as much as 15%, or more, over an intermittent on-off state period. Such a reduction of power usage in the remote transceiver will greatly extend the lifetime of the remote transceiver's power source. Moreover, the remote transceiver is able to maintain the same receiver sensitivity as a receiver that does not utilize an active polling mode as described in the present disclosure.

Upon receiving one of the series of data packets from the vehicle base station, the remote transceiver resets the timer for $T_{ON}$ allowing for the data-receiving circuit to receive the wake-up data from the vehicle base station prior to entering the off state.

FIG. 4 further shows an example embodiment of the present disclosure wherein the vehicle base station and the remote transceiver circuit have multiple channels for receiving and transmitting data. In the present embodiment, the varying channels may encompass different bandwidths of data communication and allow for multiple parallel data communication pathways. In certain embodiments, as exemplified in the LF-Receiver 125 of FIG. 1, each receiver channel communicates the signal received from one of three LF-receiver coils positioned to effectively capture LF radio waves on one of three axes of the remote transceiver. In some embodiments, the varying channels may each be controlled by independent clocks specific to the channel and/or one multi-clock circuit, wherein the varying receivers for each channel may enter on and off states independently of one another. Such an embodiment would allow the receiver to save power while still maintaining a receiver on state at all times.

Various modules or other circuits may be implemented to carry out one or more of the operations and activities described herein and/or shown in the figures. In these contexts, a "module" is a circuit that carries out one or more of these or related operations/activities (e.g., data-receiving circuit, remote transceiver circuit, or interface module). For example, in certain of the above-discussed embodiments, one or more modules are discrete logic circuits or programmable logic circuits configured and arranged for implementing these operations/activities, as in the circuit modules shown in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the present disclosure without strictly following the exemplary embodiments and applications illustrated and described herein. For example, additional antennas can be used, different communication types and different power-based transmission approaches can be implemented. Such modifications do not depart from the true spirit and scope of the present disclosure, including that set forth in the following claims.

What is claimed is:

1. An apparatus comprising:
  a vehicle base station configured and arranged to
    transmit radio frequency signals including a number (N) of a plurality of data packets with a time gap ($T_G$) between each data packet, each data packet having a first length in time ($T_1$) and including data that is common to all plurality of data packets,
    after transmitting the plurality of data packets, transmit a radio frequency signal including a wake-up data packet; and
  a remote transceiver circuit having a data-receiving circuit configured and arranged to receive the radio frequency signals from the vehicle base station, the remote transceiver circuit being configured and arranged to
    intermittently transition between on and off states in which the data-receiving circuit is respectively enabled and not enabled, each on state having a length in time ($T_{ON}$) in which $T_{ON} \geq T_G + 2T_1$, and each off state having a length in time ($T_{OFF}$) in which $T_{OFF} < (N-2)*T_1 + (N-1)*T_G$, and in response to receiving at least one of the plurality data packets via the data-receiving circuit,
operate in the on state for at least a period $T_{ON}$, and
in response to receiving the wake-up data packet while operating in the on state, transmitting response data to the vehicle base station.

2. The apparatus of claim 1, wherein
The plurality of data packets include synchronization data, and
the transceiver circuit is configured and arranged to, while in the on state, scan for the synchronization data and detect receipt of the at least one of the plurality of data packets in response to detecting the synchronization data in the at least one of the plurality of data packets.

3. The apparatus of claim 1, wherein $T_{OFF}$ further includes an initialization time ($T_{STARTUP}$) for the data-receiving circuit, each off state having a length in time $T_{OFF} < ((N)-2)*T_1 + ((N)-1)*T_G - T_{STARTUP}$.

4. The apparatus of claim 3, wherein N=3,
each on state has a length in time ($T_{ON}$) in which $T_{ON} \geq T_G + 2T_1 + T_{STARTUP}$, and
each off state has a length in time ($T_{OFF}$) in which $T_{OFF} < T_1 + 2*T_G - T_{STARTUP}$.

5. The apparatus of claim 1, wherein the remote transceiver circuit includes a counter and is configured and arranged to
operate in the on state in response to the counter being reset,
intermittently transition between the on and off states based upon a value of the counter and corresponding values of $T_{ON}$ and $T_{OFF}$, and
in response to receiving at least one of the plurality of packets in the series via the data-receiving circuit, operate in the on state by resetting the counter and receiving the wake-up data packet from the vehicle base station.

6. The apparatus of claim 5, wherein the counter includes at least one register configured and arranged to store data indicated of the values of $T_{ON}$ and $T_{OFF}$.

7. The apparatus of claim 5, wherein the remote transceiver is configured and arranged to intermittently transition between the on and off states by
transitioning from the on state to the off state in response to the counter reaching a value corresponding to $T_{ON}$; and
after transitioning from the on state to the off state, transitioning from the off state to the on state in response to the counter reaching a value corresponding to $T_{OFF}$.

8. The apparatus of claim 1, wherein
the data-receiving circuit includes a state machine having a clock, the state machine being configured and arranged to transition between the on and the off states, and
the remote transceiver circuit is configured and arranged to,
in the off state, disable the data-receiving circuit while continuing to power the state machine and the clock therein, and
in the on state, enable all circuits in the remote transceiver circuit.

9. The apparatus of claim 1, wherein
the data-receiving circuit includes channel amplifiers and a state machine having a clock, the state machine being configured and arranged to transition between the on and the off states, and
the remote transceiver circuit is configured and arranged to,
in the off state, disable the data-receiving circuit channel amplifiers while continuing to power the state machine, and the clock therein, and
in the on state, enable all circuits in the remote transceiver circuit.

10. The apparatus of claim 1,
wherein the remote transceiver circuit is configured and arranged to operate in a passive keyless go system having a vehicle activation circuit that enables operation of a drive system in a vehicle, and in response to receipt of the wake-up data packet, to transmit response data to the vehicle base station; and
wherein the vehicle base station is configured and arranged to
in response to receiving response data from the transceiver, authenticate the remote transceiver circuit by processing the response data received from the transceiver with stored authentication data; and
in response to authenticating the transceiver, enable operation of a vehicle drive circuit for operating the drive system.

11. The apparatus of claim 1, wherein the remote transceiver circuit
includes a clock having a plurality of divider flip-flops connected in series and configured and arranged to derive time intervals from a preprocessor clock input provided to a first one of the flip-flops in series by, at each flip-flop, dividing a clock signal received at the flip-flop and providing a divided clock signal as an output, the output of a last one of the flip-flops in series being provided as a clock output signal, and
the remote transceiver circuit is configured and arranged to power the clock in both the on and the off states, and to intermittently transition between the on and off states based upon the clock output signal.

12. The apparatus of claim 11, wherein the plurality divider flip-flops include seven divider flip-flops that are configured and arranged to derive time intervals that are $1/128^{th}$ of a time interval of the preprocessor clock input.

13. The apparatus of claim 1, wherein
the remote transceiver circuit is configured and arranged to store the value of $T_{ON}$ and $T_{OFF}$, and
the vehicle base station is configured and arranged to store the value of $T_G$, $T_1$ and N.

14. The apparatus of claim 1, wherein the vehicle base station is further configured and arranged to provide access to a vehicle by detecting the presence of the remote transceiver circuit.

15. The apparatus of claim 1, wherein the plurality of data packets contain identical data.

16. A method comprising:
communicating radio frequency signals between a vehicle base station and a data-receiving circuit of a remote transceiver circuit, the radio frequency signals including a number (N) of a plurality of data packets with a time gap ($T_G$) between each data packet, each data packet having a first length in time ($T_1$) and including data that is common to all the plurality of data packets;
after communicating the plurality of data packets, communicating a radio frequency signal including a wake-up data packet from the vehicle base station;
receiving the radio frequency signals via the data-receiving circuit;
intermittently transitioning the remote transceiver circuit between on and off states in which the data-receiving circuit is respectively enabled and not enabled, each on state having a length in time ($T_{ON}$) in which $T_{ON} \geq T_G + 2T_1$, and
each off state having a length in time ($T_{OFF}$) in which $T_{OFF} < ((N)-2)*T_1 + ((N)-1)*T_G$; and
in response to receiving at least one of the plurality of data packets via the data-receiving circuit,
operate in the on state for at least a period $T_{ON}$, and
in response to receiving the wake-up data packet while operating in the on state, transmitting response data to the vehicle base station.

17. The method of claim 16 further comprising:
intermittently transitioning the remote transceiver circuit between the on and off states based upon a value of a counter and corresponding values of $T_{ON}$ and $T_{OFF}$, and
in response to receiving the at least one of the plurality of data packets in the series via the data-receiving circuit, operate in the on state by resetting the counter and receiving the wake-up data packet from the vehicle base station.

18. The method of claim 16, wherein $T_{OFF}$ further includes an initialization time for the data-receiving circuit ($T_{STARTUP}$), each off state having a length in time $T_{OFF} < ((\text{number of data packets in the series})-2)*T_1 + ((\text{number of data packets in the series})-1)*T_G - T_{STARTUP}$.

19. For use with a vehicle base station that transmits radio frequency signals including a number (N) of a plurality of data packets with a time gap ($T_G$) between each data packet, each data packet having a first length in time ($T_1$) and including data that is common to all the plurality of data packets, and that transmits a radio frequency signal including a wake-up data packet after transmitting the plurality of data packets, transmit, a remote transceiver circuit comprising:
an antenna;
a data-receiving circuit coupled to the antenna and configured and arranged to receive radio frequency signals via the antenna;
a controller circuit configured and arranged to operate the data-receiving circuit in on and off states by
intermittently transitioning the data-receiving circuit between on and off states in which the data-receiving circuit is respectively enabled and not enabled, each on state having a length in time ($T_{ON}$) in which $T_{ON} \geq T_G + 2T_1$, and each off state having a length in time ($T_{OFF}$) in which $T_{OFF} < (N-2)*T_1 + (N-1)*T_G$, and in response to receiving at least one of the plurality of data packets via the data-receiving circuit,
operate the data-receiving circuit in the on state for at least a period $T_{ON}$, and
in response to receiving the wake-up data packet while operating in the on state, transmitting response data to the vehicle base station.

20. The circuit of claim 19, further including a counter circuit, the controller circuit being configured and arranged to
operate the data-receiving circuit in the on state in response to the counter being reset,
intermittently transition the data-receiving circuit between the on and off states based upon a value of the counter and corresponding values of $T_{ON}$ and $T_{OFF}$, and
in response to receiving the at least one of the plurality of data packets in the series via the data-receiving circuit, operate the data-receiving circuit in the on state by resetting the counter, and receiving the wake-up data packet from the vehicle base station.

* * * * *